United States Patent [19]
Belanger et al.

[11] Patent Number: 6,123,503
[45] Date of Patent: Sep. 26, 2000

[54] DRYER NOZZLE ASSEMBLY

[75] Inventors: Michael J. Belanger, Novi; Robert J. Wentworth, Farmington Hills, both of Mich.

[73] Assignee: Belanger, Inc., Northville, Mich.

[21] Appl. No.: 09/126,124

[22] Filed: Jul. 30, 1998

[51] Int. Cl.[7] .................................................. F03B 11/02
[52] U.S. Cl. ...................... 415/127; 415/204; 415/212.1; 417/423.14
[58] Field of Search .................................... 415/127, 128, 415/200, 203, 204, 206, 212.1, 213.1, 214.1; 417/423.1, 423.14, 423.15; 34/366

[56] References Cited

U.S. PATENT DOCUMENTS

| D. 308,123 | 5/1990 | Belanger et al. . | |
|---|---|---|---|
| D. 308,417 | 6/1990 | Belanger et al. . | |
| 1,832,899 | 11/1931 | Frederics | 417/423.1 |
| 2,949,678 | 8/1960 | Anderson . | |
| 3,407,993 | 10/1968 | Bostrom | 415/127 |
| 4,599,042 | 7/1986 | Colliver | 415/204 |
| 4,848,670 | 7/1989 | Belanger et al. . | |
| 4,882,826 | 11/1989 | Belanger et al. . | |

Primary Examiner—Edward K. Look
Assistant Examiner—Rhonda Barton
Attorney, Agent, or Firm—Young & Basile, P.C.

[57] ABSTRACT

A blower/dryer assembly of the type comprising an electric motor, an impeller attached to the output shaft of the motor to be driven thereby, a molded plastic toroidal housing surrounding the impeller and a discharge nozzle attached to the impeller housing. The housing is attached to an adapter plate on the base plate of the motor by means of threaded fasteners arranged in a circular pattern which pass through slotted openings in the adapter plate and into reinforcement plates on the inside surface of the impeller housing. The slotted openings permit the angular relationship between the impeller housing and the adapter plate to be non-incrementally varied over a substantial angular range. The impeller housing is formed of a large diameter clearance opening in the surface immediately adjacent the motor end plate so as to receive therein the large diameter adapter plate. The opening is of such size as to permit the impeller housing to be removed from the adapter plate by passing the impeller through the opening thereby to eliminate the necessity of disassembling the impeller from the motor shaft for housing removal. The impeller housing and the nozzles are formed as separate components adjoined by mating flanges so as to facilitate nozzle replacement and/or exchange.

8 Claims, 4 Drawing Sheets

DRYER NOZZLE ASSEMBLY

FIELD OF THE INVENTION

This invention relates to nozzle assemblies for use with impeller-type air blowers found in vehicle laundries and the like, and further to a nozzle assembly which greatly facilitates repair and replacement activities, and enhances flexibility in nozzle design and utilization.

BACKGROUND OF THE INVENTION

U.S. Pat. No. 4,882,826 "Method of Making a Unit Blower Housing", issued to James A. Belanger, Robert J. Wentworth, Barry S. Turner and Graham J. Astley and assigned to Belanger, Inc. of Northville, Mich., discloses a molded plastic housing for an impeller type air blower assembly for use in auto laundries and the like. The housing 13 comprises a generally toroidal portion formed by a circular outer wall 19 which blends into a generally tangential discharge outlet 15. As shown in FIG. 4 of that patent, an electric motor 61 for driving the impeller 25 is mounted on a pad 59. The motor housing 13 is connected to a plate 67 which is secured by bolts to one of the parallel faces of the impeller housing in such a way that the motor shaft 65 extends through a small hole in the impeller housing and into the interior volume of the housing where it is attached to the generally cylindrical impeller 25. Air is drawn into the housing through a relatively large opening 23 in the opposite face of the impeller housing.

Disassembly of the apparatus shown in FIG. 4 of the 862 patent requires that the impeller be removed from the motor drive shaft and withdrawn through the clearance opening 23 before the housing 13 can be removed or replaced. The structure shown in the patent does not permit angular adjustment or rotational adjustment of the impeller housing relative to the motor housing about the axis of the shaft 65 other than to remove the bolts 75 and rotate the housing by the angular distance between the bolt holes.

Although impeller housings and air discharge nozzles can be constructed as separate components joined by bellows type duct joints as suggested in the 826 patent, it has become more common to manufacture the impeller housing and nozzle as a single unit; see for example U.S. Design Pat. No. 315,232 issued Mar. 5, 1991 to James A. Belanger and Graham J. Astley and assigned to Belanger, Inc. of Northville, Mich.

SUMMARY OF THE INVENTION

The present invention provides for flexibility in the repair, replacement and/or reconfiguration of nozzle assemblies for auto laundry blower-driers and the like. More specifically, a first aspect of the invention provides for the manufacture of impeller housings and discharge nozzles as separate components capable of being joined together to provide a unified assembly without the necessity for bellows type duct joints. In general this is accomplished by configuring both the impeller housing and the discharge nozzle as separate components with complementally mating flanges surrounding an air discharge passage, and providing means for connecting one structural unit to the other in such a way as to create the appearance of a unitary assembly but at the same time permitting flexibility in the exchange and/or reconfiguration of the nozzle design.

According to a second aspect of the invention the repair and/or replacement of impeller nozzle housings and/or access to the impeller and associated motor components is facilitated by way of an impeller housing design which is mounted to a motor stator housing but which can be more easily removed from the motor stator housing without the necessity for first removing and/or dismantling the impeller. In general this is accomplished by manufacturing the impeller housing in such a way as to incorporate a clearance opening in the plane face which is adjacent the motor stator housing in the operative combination. This clearance opening is at least as large as the diameter of the impeller such that the housing may be disconnected from the motor stator structure and removed by causing the impeller to pass through the clearance opening without prior disassembly from the motor shaft.

According to a third aspect of the invention the angular relationship between a drive motor and an impeller housing is made infinitely variably adjustable through a relatively large included angle without the necessity for disassembly or removal of threaded fasteners and the like. In general this is accomplished by mounting the impeller housing to a motor stator plate having a plurality of concentric slotted openings for receiving threaded fasteners which extend into and are secured to the impeller housing. Accordingly, by simply loosening the fasteners, the impeller housing may be rotated about the motor axis through any desired angle and resecured in the desired position to locate the nozzle discharge openings relative to the article or articles to be impinged by the outlet air stream.

These and other features and advantages of the invention will become apparent from a reading of the following specification which is to be taken with the accompanying drawings.

DETAIL DESCRIPTION OF THE ILLUSTRATIVE EMBODIMENTS

Figure 1:
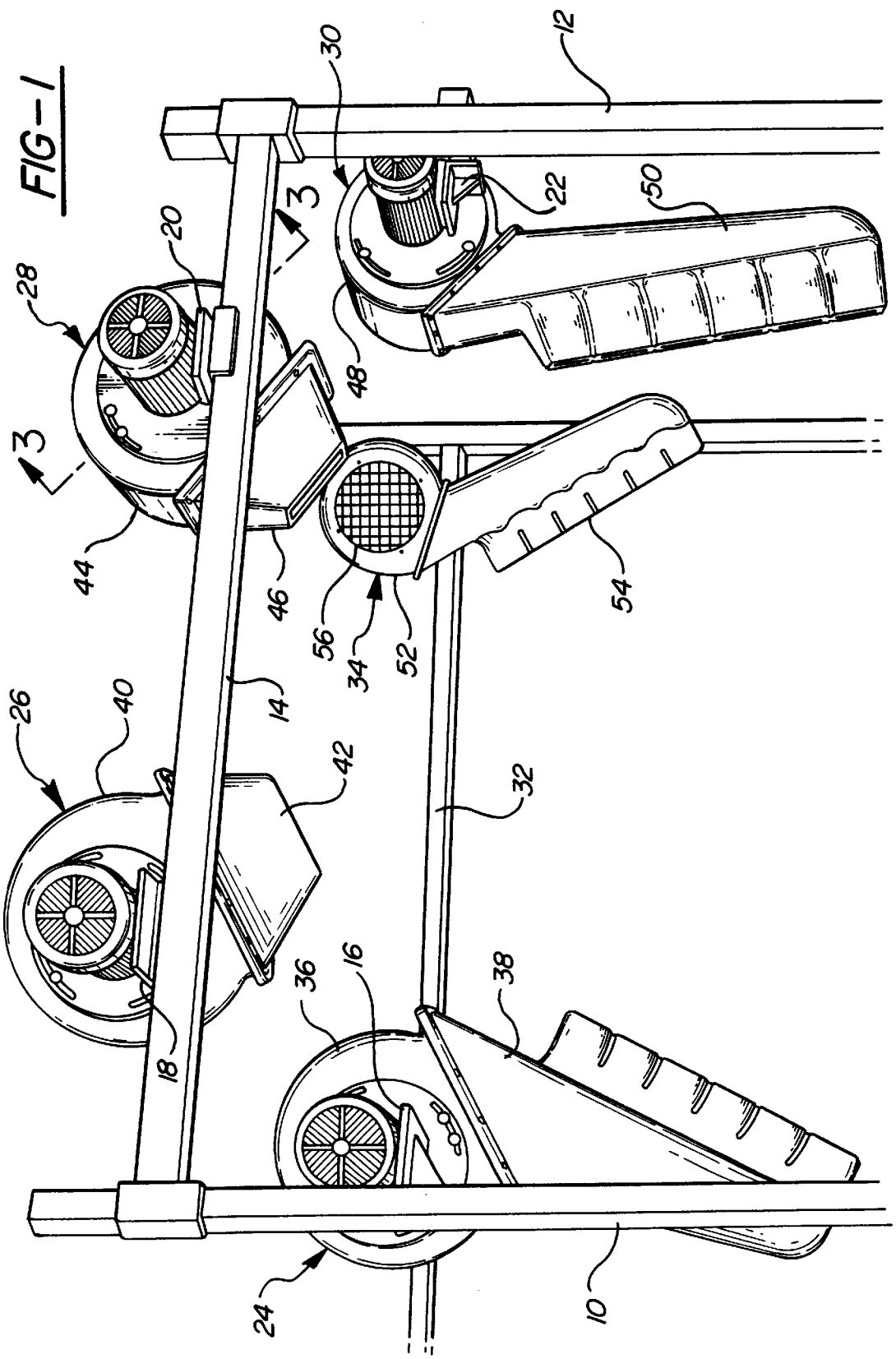
FIG. 1 is a perspective view of several turbine type dryer assemblies mounted on hollow tubular aluminum beams and incorporating the inventive subject matter described above.

Referring now to FIG. 1, an arch structure of the type typically found in automobile and truck laundries is shown to comprise hollow tubular aluminum vertical beams 10 and 12 and a hollow aluminum horizontal cross-beam 14. The beams 10, 12 and 14 are of such size, structural strength and arrangement as to be capable of carrying heavy loads and permitting conventional automobiles, vans or light trucks to pass therethrough without interference. Of course the structure may be made of any desirable size to accommodate still larger and or considerably smaller articles. For example, the system described herein may be used to remove dust from auto body parts prior to painting, in which case the support system may be smaller. Alternatively, it may be used to dry train cars after washing, in which case it may be quite large.

For purposes of illustration, the beam 10 has a mounting pad 16 secured thereto by welding or other suitable means. The crossbeam 14 has mounting pads 18 and 20 secured thereto at spaced locations and beam 12 has a mounting pad 22 secured thereto for purposes to be described. Pad 16 carries an electric motor driven turbine blower assembly 24 having a molded plastic impeller housing 36 and a depending air directing discharge nozzle 38 attached thereto. Pad 18 supports a similar assembly 26 comprising an impeller housing 40 and a discharge nozzle 42 having a configuration which is somewhat different from that of nozzle 38. Pad 20 supports an assembly 28 which is similar to assembly 26 but arranged in a mirror image fashion as far as air flow direction is concerned. Pad 22 supports an assembly 30 having a molded plastic impeller housing 48 and an elongate discharge nozzle 50 arranged as the mirror image of discharge nozzle 38.

Again for purposes of illustration, a second arch comprising crossbeam 32 and vertical beam 33 is shown behind the arch 10, 12, 14 in the foreground and carries an assembly 34 having a discharge nozzle 54 which is similar to the discharge nozzles 38 and 50 but mounted such that the air discharge direction is more downwardly oriented than that of the nozzle 50 which lies in front of it. The assembly 34 is shown from the inlet side of the air flow path and the inlet is protected by a screen 56 over a large clearance opening in the impeller housing 52.

The assemblies 24, 26, 28, 30 and 34 are all very similar in construction with the exception of the specific configuration of the discharge nozzles, a benefit which derives from the fact that the impeller housings and discharge nozzles are fabricated as separate assemblies and joined by means further shown and described in detail with respect to FIGS. 2, 3, 4, and 5. Because of the similarity, only one of the assemblies will be described in detail.

Looking now to FIGS. 2–5, the assembly 28 comprises a D.C. motor 56, the stator housing 59 of which has an end plate 58 which is fixed to the stator housing. Base plate 60 lies against and is attached to the end plate 58 by welding or the like and is provided with a number of threaded holes to receive bolts 64 for purposes to be described. A large diameter adapter plate 62 is connected to the base plate 60 by the bolt 64. Both of the plates 60 and 62 have a center aperture through which the motor shaft 66 which passes. The shaft 66 carries an impeller 68 which is fully enclosed by the molded plastic impeller housing 44.

Figure 2:
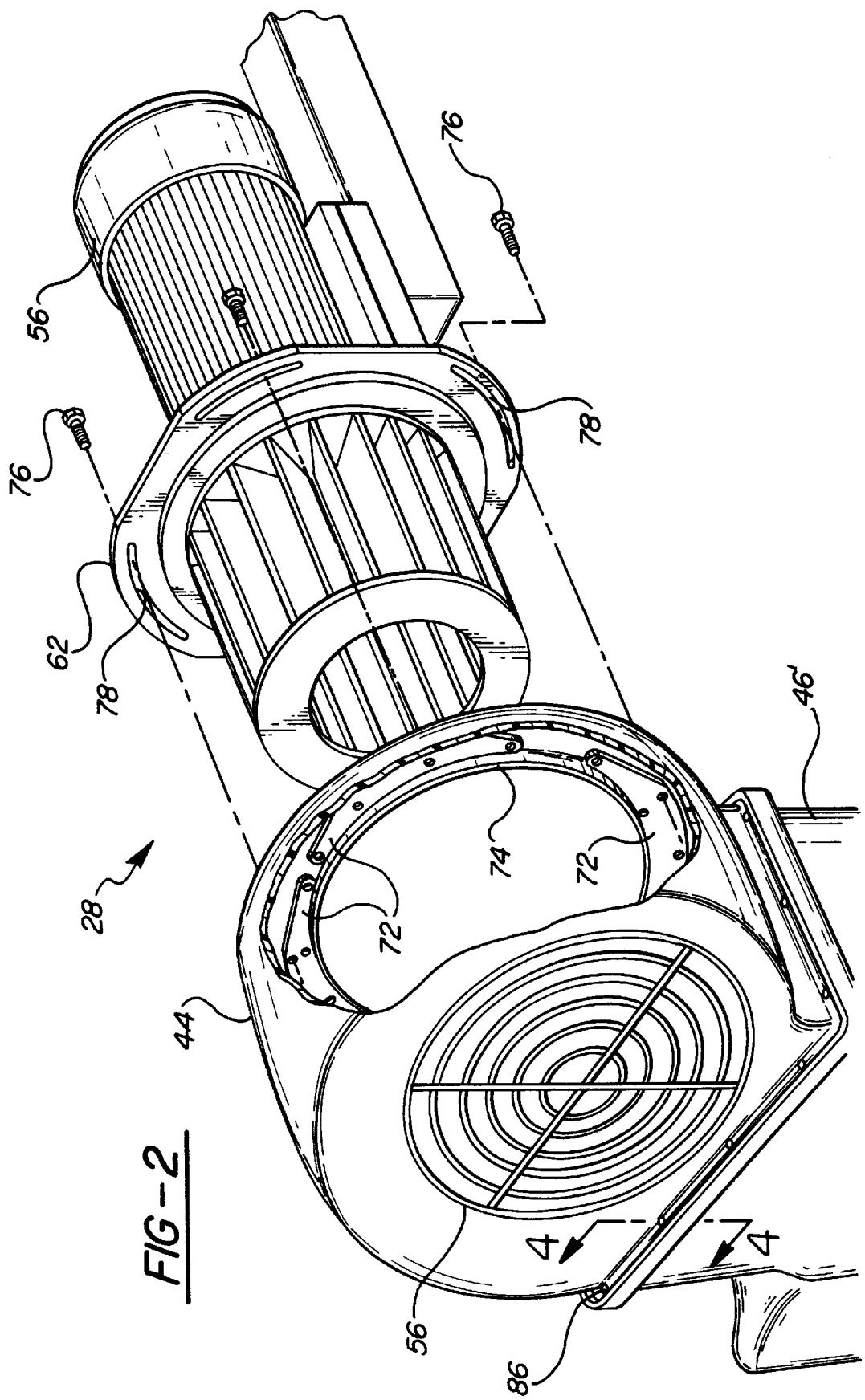
FIG. 2 is an exploded view in perspective of one of the dryer assemblies of FIG. 1 illustrating the manner in which the impeller drive motor housing is connected to the impeller housing and discharge nozzle.
Figure 3:
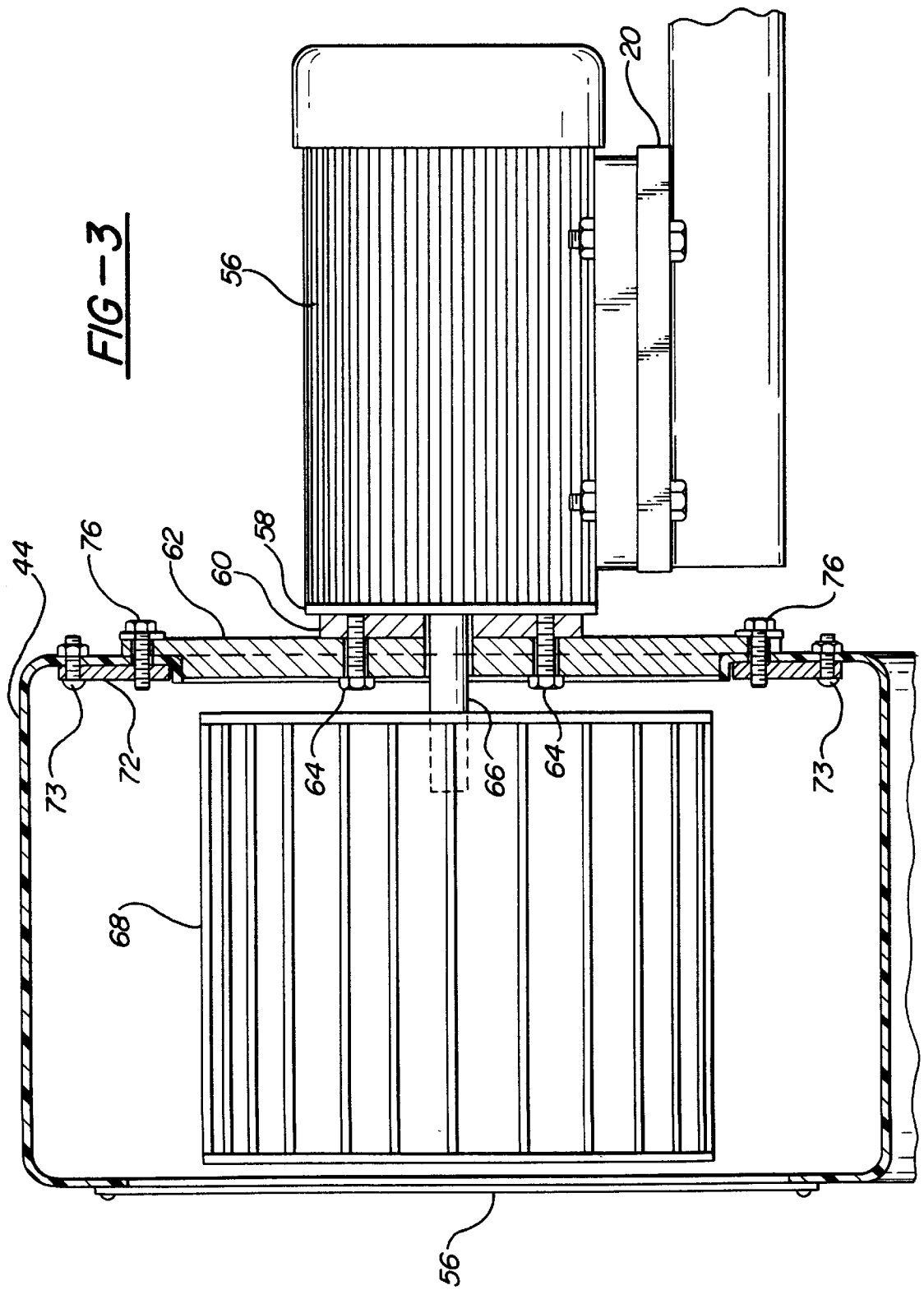
FIG. 3 is a side view in section of the assembly of FIG. 2.

As best shown in FIG. 2, the impeller housing 44 is formed with a flanged clearance opening 74 which is larger in diameter than the impeller 68 but slightly smaller in diameter than the stator plate 62. Secured by bolts 73 to an inside surface of the impeller housing 44 immediately adjacent the flanged opening 74 are reinforcement plates 72 which have threaded holes to receive machine screws 76 to secure the impeller housing 44 to the stator plate 62 of the motor 56. As also shown in FIG. 2, the adapter plate 62 is provided with four angularly spaced slots 78 having an included angle of approximately 20° to permit the impeller housing 44 to be angularly adjusted about the axis of the motor shaft 66 within a 20° range simply by loosening the machine screws 76, making the adjustment and retightening the machine screws when the impeller housing 44 and the depending nozzle attached thereto is in the desired angular orientation.

Figure 4:
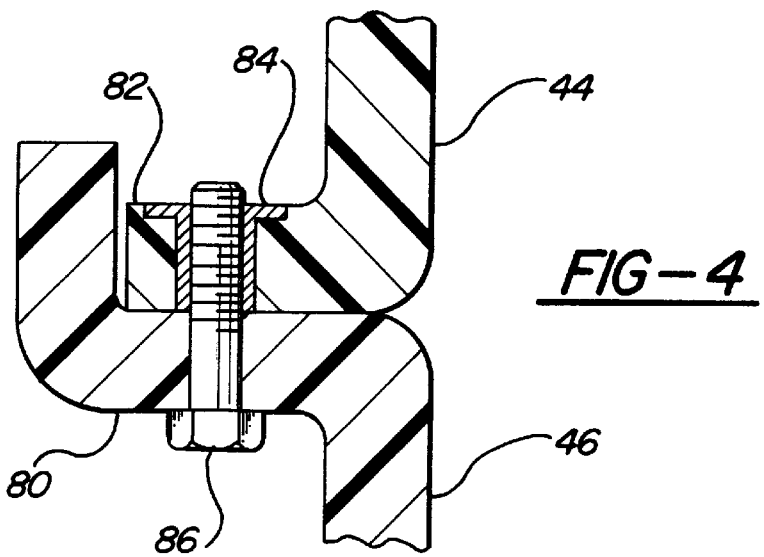
FIG. 4 is a sectional view of a detail of the assembly of FIG. 2 showing the manner in which the impeller housing is connected to the nozzle housing.

As best shown in FIGS. 2 and 4, the impeller housing 44 is of a generally toroidal shape but terminates in a rectangular opening surrounded by a flange 82 having a threaded insert 84 suitably positioned therein. The flange 84 is complementally matable with the end flange 80 of the nozzle structure 46 and a tight seal is achieved by means of a threaded machine screw 86 which passes through a preformed opening in the nozzle flange 80 and which is aligned with the opening in the threaded insert 84. Clips, clamps and other means of attachment may, of course, be substituted for the screws 86 and inserts 84. As shown in FIG. 2, approximately 10 or 12 such screws/insert combinations are used to provide a secure interconnection between the nozzle structure and the impeller housing 44.

Figure 5:
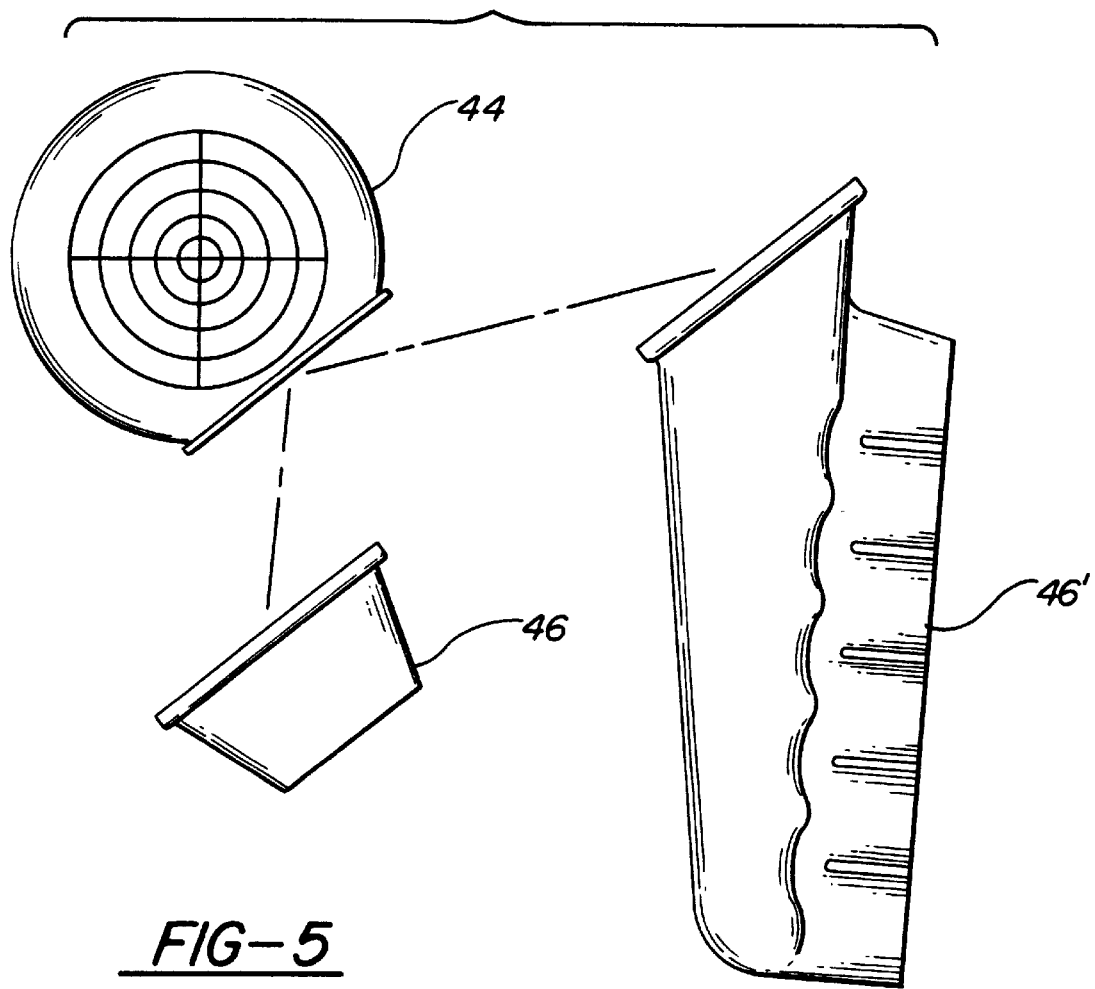
FIG. 5 is a schematic diagram indicating the interchangability of nozzle structures of different configuration with the impeller housing of the assembly shown in FIGS. 1–4.

As shown in FIG. 5, it is a relatively simple matter to replace and/or exchange the nozzles 46 and 46 prime simply by removing the fasteners 86, thereafter removing the previously attached nozzle structure and replacing it with another nozzle structure of the same or different configuration. In use, it will be apparent from the forgoing that the entirety of the impeller housing structure 44 and any depending nozzle structure 46 which may be attached to it is simply removed from the motor 56 and impeller 68 without any necessity for detaching or removing the impeller 68 from the shaft 66. This is simply achieved by removing the machine screws 76 and withdrawing the housing 64 from the stator plate 62 such that the impeller 68 passes through the clearance opening 74 in the impeller housing 44.

When reinstalling the impeller housing on the stator plate 62, an approximate selection in the angular orientation of the depending nozzle may be achieved by positioning the nozzle housing 46 about the axis of the shaft 66. A finer selection in angular orientation is then permitted by the slots 78 before the screws 76 are tightened.

Should a nozzle be damaged or should it be desirable to reconfigure the laundry, any nozzle 46 or 46' may be easily removed from its associated impeller housing 44 by removing the fasteners 86 and attaching a replacement nozzle. No bellows or ducting is required and a good air seal is readily achieved by means of the mating flanges shown in FIG. 4.

By way of summary the invention provides: (1) impeller housings and discharge structures which, although capable of being joined together as a unitary assembly, may be simply and easily separated from one another through the manipulation of threaded fasteners, clips or other known attachment devices so that nozzles may be easily replaced and/or exchanged for other different nozzles, (2) an impeller housing which can be removed from operative association with the drive motor without the need for prior disassembly of the impeller from the drive motor shaft and (3) simple and expeditious adjustment in the angular relationship of the nozzle discharge air stream to the surrounding environment without the need for substantial disassembly or the introduction of intermediate ducting.

What is claimed is:

1. A dryer nozzle assembly including a generally toroidal impeller housing, a generally cylindrical rotary impeller positioned within the impeller housing for creating a high volume air current, and a motor having a stator plate and a drive shaft protecting through the stator plate and rotatable relative thereto, said housing having opposite faces joined by a surface of revolution; one of said faces having a clearance opening formed therein the major dimension of which is greater than the diameter of said rotary impeller but less than the diameter of said stator plate; the dryer further including fastener means releasably securing a peripheral outer region of the stator plate to the impeller housing in surrounding overlapping relation to the clearance opening whereby said fastener means may be released to allow the housing to be removed from surrounding relationship with said impeller without disconnecting said impeller from the drive motor.

2. A dryer nozzle assembly as described in claim 1 which is fabricated from a polymeric material.

3. A dryer nozzle assembly as defined in claim 2 wherein the fastener means include threaded fasteners and wherein the dryer assembly further includes reinforcing means mounted to an inside surface in surrounding relationship to said opening for receiving the threaded fasteners.

4. A dryer nozzle assembly as defined in claim 3 further including means for permitting adjustment in the angular relationship between the housing and said stator plate.

5. A dryer nozzle assembly according to claim 4 wherein;
said adjustment means includes arcuate concentric slots formed in said stator plate; and
the threaded fasteners are passed through the slots and through the impeller housing for threaded engagement with the reinforcing means.

6. A dryer nozzle assembly for use in automobile wet wash facilities comprising:
a motor having a stator plate and a drive shaft;
an impeller housing adapted to be mounted on said stator plate in spaced surrounding relationship to said impeller; and
fasteners threadably received in one of said stator plate and said impeller housing and passing through slots in the other of said stator plate and impeller housing whereby to secure the impeller housing to the stator plate but permit non-incremental angular travel of said housing about the impeller axis relative to said stator plate within the angular limits defined by said slots in response to loosening of the fasteners.

7. A dryer assembly as defined in claim 6 further including a nozzle housing essentially unitary with said impeller housing and extending away therefrom.

8. A generally toroidal impeller housing for use in combination with a motor driven, generally cylindrical rotary impeller for creating a high volume air current, said housing having opposite faces joined by a surface of revolution; one of said faces having a clearance opening formed therein the major dimension of which is greater than the diameter of said rotary impeller; said one face, in the assembled state, being proximate the drive motor such that the housing may be removed from surrounding relationship with said impeller without disconnecting said impeller from the drive motor; the housing being fabricated from a polymeric material; the housing further including reinforcing means mounted to an inside surface in surrounding relationship to said opening for receiving threaded fasteners; the apparatus further including a motor having a stator plate and a drive shaft projecting through the stator plate and rotatable relative thereto, and means including threaded fasteners for attaching the stator plate to the housing reinforcing means; the apparatus further including means for permitting adjustment in the angular relationship between the housing and the stator plate; the adjustment means comprising arcuate, concentric slots formed in the stator plate.

* * * * *